United States Patent [19]

Oshima et al.

[11] 4,095,130
[45] June 13, 1978

[54] SYNCHRONOUS MOTOR

[75] Inventors: Kenji Oshima; Tomohisa Matsumoto; Hiroshi Yamazaki; Tamotsu Yoshioka, all of Tokyo, Japan

[73] Assignee: Kabushiki Kaisha Seikosha, Japan

[21] Appl. No.: 723,950

[22] Filed: Sep. 16, 1976

[30] Foreign Application Priority Data

Sep. 23, 1975 Japan ............................. 50-115199

[51] Int. Cl.² ............................................. H02K 21/00
[52] U.S. Cl. .............................. 310/162; 310/40 MM; 310/156
[58] Field of Search ................ 310/40 MM, 156, 165, 310/162, 90, 163, 254, 164, 166, 49, 154; 58/23 D; 318/165, 166, 185

[56] References Cited

U.S. PATENT DOCUMENTS

| 2,909,685 | 10/1959 | Szabo ................................. 310/163 |
| 3,878,414 | 4/1975 | Harakawa ........................... 310/156 |
| 3,949,251 | 4/1976 | Takatsuki ............................ 310/156 |
| 3,978,651 | 9/1976 | Yoshino ........................ 310/40 MM |
| 3,979,616 | 9/1976 | Stechmann ........................... 310/49 |
| 3,984,972 | 10/1976 | Yoshino ........................ 310/40 MM |
| 3,991,332 | 11/1976 | Kawamura ........................... 310/162 |
| 4,017,851 | 4/1977 | Felice ................................ 310/49 |

FOREIGN PATENT DOCUMENTS

| 2,509,883 | 11/1975 | Germany ........................ 310/40 MM |
| 2,410,745 | 10/1974 | Germany ........................ 310/40 MM |

Primary Examiner—R. Skudy
Attorney, Agent, or Firm—Robert E. Burns; Emmanuel J. Lobato; Bruce L. Adams

[57] ABSTRACT

A stator has a pair of magnetic pole portions, and a rotor having N- and S-poles is disposed between the two magnetic portions. Each magnetic pole portion of the stator has two static magnetic poles and a cut-away portion or indent formed therebetween. The stator is quadripolar statically, and bipolar dynamically.

4 Claims, 4 Drawing Figures

SYNCHRONOUS MOTOR

FIELD OF INVENTION

This invention relates to a motor, and more particularly to a miniature motor.

BACKGROUND OF THE INVENTION

In a prior-art inductor type motor, the magnetic pole portions of a rotor and a stator correspond at 1-to-1, and poles are concentrated in the magnetic pole portions. According to this construction, the coupling between the rotor and the stator is intense, and the motor cannot be made self-starting. The pull-in is therefore effected by bestowing rotation on the rotor by the use of a starter separately provided. Besides, since the cut-away portion or indent of the stator cannot be made large, the motion of the rotor lacks in smoothness and the pull-out is prone to occur.

SUMMARY OF THE INVENTION

This invention eliminates the technical disadvantages of the prior art.

According to one feature of this invention, there is provided a motor comprising a stator which has two stator arms and magnetic pole portions formed at fore ends of the stator arms and opposing to each other, each said magnetic pole portion having two static poles and an indent formed therebetween, and a rotor which has a pair of N - S poles and which is disposed between the magnetic pole portions.

An object of this invention is to provide a miniature motor which is easily self-started by a small amount of input.

Another object of this invention is to provide a motor whose continuous rotation is smooth.

BRIEF DESCRIPTION OF DRAWING

These and other objects and features of this invention will become apparent from the following description and the appended claims.

In the drawing.

DESCRIPTION OF PREFERRED EMBODIMENTS

Figure 1:
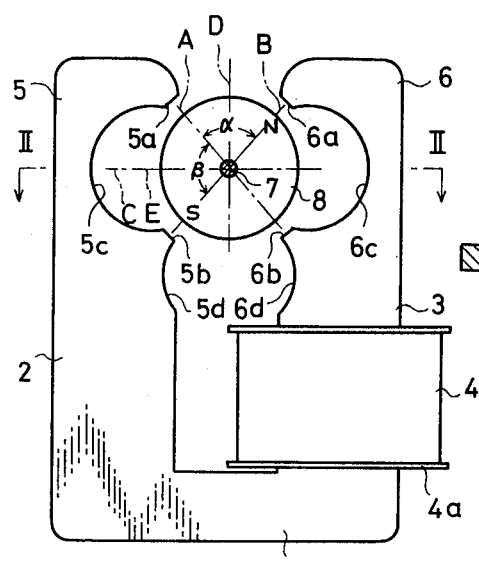
FIG. 1 is a plan view of an embodiment of this invention.
Figure 2:
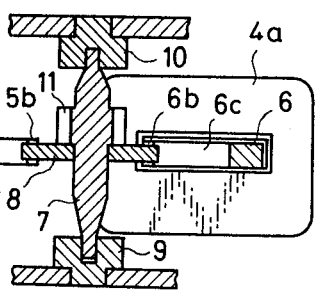
FIG. 2 is a sectional view taken along line II — II in FIG. 1.

Referring to FIGS. 1 and 2, a substantially U-shaped stator 1 has two arms 2 and 3. A bobbin 4a on which a coil 4 is wound is fitted on one arm 3. Symmetric stator pole portions 5 and 6 are formed at the fore end parts of the arms 2 and 3, respectively. The stator pole portion 5 includes static magnetic poles 5a and 5b, an arcuate indent 5c which is formed between the static magnetic poles 5a and 5b, and an indent 5d which is formed below the static magnetic pole 5b. The stator pole portion 6 is formed symmetrically to the pole portion 5, and includes static magnetic poles 6a and 6b and indents 6c and 6d. At the central position of the static magnetic poles 5a, 5b, 6a and 6b, a shaft 7 to which a rotor 8 is secured is rotatably supported between bearings 9 and 10. The rotor 8 is a bipolar rotor, and is formed with N- and S-poles at opposing positions. A rotor pinion 11 is integrally formed on the shaft 7.

The static magnetic poles 5a and 6a and those 5b and 6b expand by an angle α with respect to the axis of the shaft 7 of the rotor 8, while the static magnetic poles 5a and 5b and those 6a and 6b open by an angle β with respect to the axis. A line A is a static magnetic center line which couples the static magnetic poles 5a and 6b, while a line B is a static magnetic center line which couples the static magnetic poles 5b and 6a. When the coil 4 has no input, the rotor 8 becomes stationary under the state under which its N- and S-poles are magnetically coupled with the stator pole portions 5 and 6 at the shortest distance therefrom. That is, the N- and S-poles of the rotor 8 stop along the line A or B. This is because the indents or cut-away portions 5c and 6c are feeble in the magnetic coupling force with the rotor 8. When the coil 4 has an input, the dynamic magnetic center of the stator pole portions 5 and 6 lies on a line C which couples the center between the static magnetic poles 5a and 5b and the center between the static magnetic poles 6a and 6b, in other words, it lies on the bisector of the angle β.

Figure 3:
FIG. 3 is a diagram of an input waveform.

The operation of the motor will be described. It is now assumed that when the coil 4 has no input, the rotor 8 is stationary with the N-pole opposing to the static magnetic pole 6a of the stator and the S-pole opposing to the static magnetic pole 5b as shown in FIG. 1. When the coil 4 receives an input of a waveform as shown in FIG. 3, the stator pole portions 5 and 6 have S - N poles and N - S poles alternately produced on the line C. In case where, when the rotor 8 is stationary under the state shown in FIG. 1, the coil 4 receives the initial input and the stator pole portion 5 is magnetized into the S-pole and the portion 6 into the N-pole, the S-pole of the rotor repels the S-pole of the stator pole portion 5 and the N-pole of the rotor repels the N-pole of the stator pole portion 6, so that the rotor is swung anticlockwise. However, the rotor 8 is not rotated yet and is merely swung. Subsequently, when the magnetic pole portion 5 is magnetized into the N-pole and the magnetic pole portion 6 into the S-pole by the inverted second input signal, the S-pole of the rotor is attracted by the magnetic pole portion 5 and the N-pole of the rotor by the magnetic pole portion 6, so that the rotor is swung clockwise. When the operation is repeated several times and the rotor 8 swings beyond a half of the angle β, the N - S poles of the rotor exceed the dynamic magnetic center line C of the stator and rotate clockwise to the next static magnetic center line A, and the S-pole of the rotor opposes to the static magnetic pole 5a and the N-pole to the static magnetic pole 6b. Then, the next inverted input signal is received. When the stator pole portion 5 is magnetized into the S-pole and the stator pole portion 6 into the N-pole, the N- and S-poles of the rotor are respectively repelled and the rotor further rotates clockwise to the static magnetic center line B. Thereafter, the rotation in the same direction is smoothly continued at every inverted input. That is, when the rotor 8 goes beyond a half of the angle β, the rotor begins to rotate in one direction. The magnetic coupling force between the stator and the rotor at the stationary condition is made small in this manner, whereby the rotor can be easily swung by a small amount of input to the coil. By making the angular frequency of the rotor and the input frequency substantially equal, the resonance phenomenon state is established. When the swing angle of the rotor is gradually increased and the N- and S-poles of the rotor go beyond the dynamic magnetic center of the stator, the motor begins to rotate as a synchronous motor.

In driving the rotation of the rotor 8, the indents or cut-away portions 5d and 6d respectively formed below the static magnetic poles 5b and 6b act effectively. Without the indents, the rotor 8 is affected by the magnetic forces of the parts of the arms 2 and 3 below the static magnetic poles 5b and 6b and is difficult to shift from the vibrating motion to the rotating motion. This is because a control force, i.e., a force continuing to vibrate the rotor, which is proportional to the speed of the rotor acts and impedes the shift to the rotational motion. By forming the indents 5d and 6d, the forces of magnetic influences of the parts on the rotor are reduced, whereby the rotor can smoothly shift from the vibration to the rotation by the small amount of input.

In the foregoing embodiment of FIG. 1, the static magnetic center lines of the stator 1 are A and B. It can occur, however, that the N- and S-poles of the rotor 8 do not become stationary exactly along A or B, but that they become stationary along D or E being the respective neutral lines. In such case, if they stop along the line D, no problem is posed. However, if they stop along the line E, no torque is generated in the rotor 8 even in the presence of the input in the coil 4 because, in the embodiment shown in FIG. 1, the line E is coincident with the dynamic magnetic center line C of the stator 1.

Figure 4:
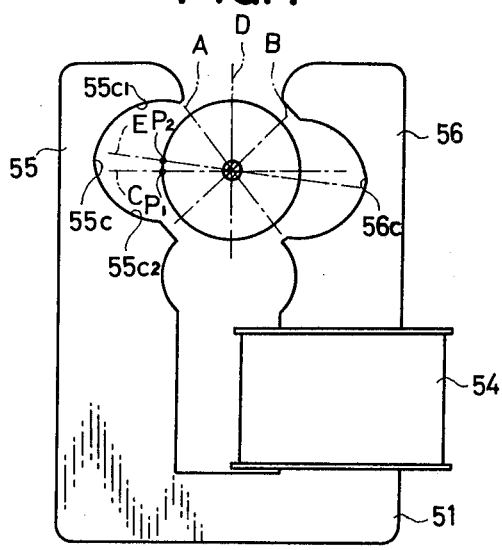
FIG. 4 is a plan view of another embodiment.

A motor shown in FIG. 4 is constructed so as to reduce the occurrence of such dead point. The difference of the embodiment of FIG. 4 from that of FIG. 1 resides in the shape of indents or cut-away portions 55c and 56c. The indent 55c consists of a circular arc part $55c_1$ with its center at a point $P_1$, and a circular arc part $55c_2$ with its center at a point $P_2$. The indent 56c is formed symmetrically to the indent 55c with respect to an axis 57. It has been experimentally revealed that, even with such form of the indents 55c and 56c, the dynamic magnetic center line C is not considerably influenced or changed. As in the case illustrated in FIG. 1, accordingly, the dynamic magnetic center lies on the line C. In contrast, the static magnetic neutral line E somewhat deviates clockwise relative to the line C under the influences of the indents 55c and 56c. Therefore, even when the N- and S-poles of the rotor 8 become stationary along the line E, the self-start is reliably effected since the line E slightly deviates from the dynamic magnetic center line C. The shape of the cut-away portions 55c and 56c is not restricted to that shown in FIG. 4, but essentially the cut-away portions may be constructed so as to cause the static magnetic neutral line E of both the poles to deviate from the dynamic magnetic center line C.

We claim:

1. A synchronous electric motor comprising a stator having two spaced stator arms with like magnetic pole portions formed at fore ends thereof and opposing each other, an energizing coil on said stator, and a rotor rotatably disposed between said magnetic pole portions and having a pair of N- and S-poles, each of said magnetic pole portions having two static magnetic poles at equal distance from said rotor and an indent between said poles spaced at a greater distance than said poles from said rotor, whereby said stator is quadripolar statically and bipolar dynamically.

2. A synchronous electric motor according to claim 1, in which said four static magnetic poles of said stator are uniformly angularly disposed around said rotor.

3. A synchronous electric motor according to claim 1, in which said indents are symmetrical with respect to a line bisecting the angle between said static magnetic poles of each of said pole portions.

4. A synchronous electric motor according to claim 1, in which said indents are asymmetrical with respect to a line bisecting the angle between said static magnetic poles of each of said pole portions.

* * * * *